United States Patent
Englert et al.

(10) Patent No.: US 7,875,358 B2
(45) Date of Patent: Jan. 25, 2011

(54) SLURRY AND ACOUSTICAL PANEL WITH REDUCED BOUND WATER

(75) Inventors: Mark H. Englert, Libertyville, IL (US); Daniel E. Boss, Hainesville, IL (US)

(73) Assignee: USG Interiors, Inc., Chicago, IL (US)

( * ) Notice: Subject to any disclaimer, the term of this patent is extended or adjusted under 35 U.S.C. 154(b) by 499 days.

(21) Appl. No.: 11/825,555

(22) Filed: Jul. 6, 2007

(65) Prior Publication Data

US 2009/0011251 A1 Jan. 8, 2009

(51) Int. Cl.
 *B32B 3/26* (2006.01)
 *B32B 13/12* (2006.01)
 *B28B 11/00* (2006.01)
 *C04B 41/48* (2006.01)

(52) U.S. Cl. ........................ 428/451; 428/446; 428/500; 106/287.1; 106/287.23; 106/409; 106/499; 264/232; 264/7; 264/134

(58) Field of Classification Search ........................ None
See application file for complete search history.

(56) References Cited

U.S. PATENT DOCUMENTS

| | | | | |
|---|---|---|---|---|
| 2,634,208 A | * | 4/1953 | Miscall et al. | 162/171 |
| 3,407,138 A | * | 10/1968 | Harper et al. | 252/2 |
| 4,212,755 A | * | 7/1980 | Ruff et al. | 252/62 |
| 4,302,344 A | * | 11/1981 | Ruff et al. | 252/62 |
| 5,964,934 A | | 10/1999 | Englert | |
| 2004/0209071 A1 | | 10/2004 | Carbo et al. | |

* cited by examiner

*Primary Examiner*—Ling Xu
(74) *Attorney, Agent, or Firm*—Greer, Burns & Crain, Ltd.; Pradip Sahu, Esq.; Philip T. Petti, Esq.

(57) ABSTRACT

A composition for a slurry for manufacture of a building panel includes one or more fillers, one or more binders and water. One or more fillers is an expanded perlite at least partially covered with a film-forming, thermoplastic polymer coating Some embodiments use calcined or uncalcined gypsum as a binder or filler. One embodiment is a building panel that includes a solid matrix of calcium sulfate dihydrate crystals bound to expanded perlite.

A method of making the panel includes acquiring expanded perlite and coating it with film-forming, thermoplastic polymer coating. After the expanded perlite is prepared, it is combined with water other optional fillers and one or more binders to form a slurry. The slurry is shaped into a panel and allowed to dry.

18 Claims, No Drawings

SLURRY AND ACOUSTICAL PANEL WITH REDUCED BOUND WATER

BACKGROUND

This invention is related to acoustical or ceiling panels. More specifically, this invention relates to acoustical panels that have less bound water, and are therefore easier to dry than conventional panels.

Acoustical tiles, also known as acoustical panels, ceiling tiles or ceiling panels, are well known in the building trades for providing a ceiling that is quickly installed, inexpensive and lightweight. The tiles are prepared from a slurry of fillers and binders, most frequently by either a casting process or a water felting process.

In the water felting of such a slurry, a dispersion of fibers, binders, and other ingredients flow onto a moving, porous support, such as that of a Fourdrinier or Oliver mat forming machine for dewatering. The dispersion is dewatered first by gravity and then by pressing and vacuum suction means. The wet basemat is dried in heated convection drying ovens and the dried material is cut to the desired dimensions, fissured and/or perforated to impart acoustical absorbency and optionally top coated, such as with paint, to produce acoustical tiles and panels.

Acoustical tile is also made by a wet pulp molded or cast process such as that described in U.S. Pat. No. 1,769,519. A molding composition that includes fibers, fillers, colorants and a binder is prepared for molding or casting the body of the tile. This mixture is placed upon suitable trays which have been covered with paper or a paper-backed metallic foil and then the composition is formed to a desired thickness with a screed bar or roller. A decorative surface, such as elongated fissures, may be provided by the screed bar or roller. The trays filled with the pulp are then placed in an oven to dry or cure the composition. The dried sheets are removed from the trays and may be treated on one or both faces to provide smooth surfaces, to obtain the desired thickness and to prevent warping. The sheets are then cut into panels of a desired size.

Fillers that are very lightweight are preferred for use in the making of acoustical tiles because they act as a bulking agent thus contributing to a lower density and overall lighter product. This lighter final product is desirable because it lessens shipping weight and provides for ease in handling and installation. Expanded perlite is a preferred filler material because it provides bulking and is lightweight.

Expanded perlite has an internal structure that consists largely of interconnecting open cells. This structure leads to the absorption of water into the interior of the perlite particles by capillary action. It has been found that the water in the acoustical ceiling tile dispersion is present essentially in two modes. Free water is defined as water which can be removed mechanically from the furnish, including drainage through the wire, with and without vacuum, and through the press section of the process. Bound water is defined as water that is contained within the interior of the particles particularly the perlite particles either by hydrogen bonding or capillary action, and which cannot be removed mechanically, such as by suction or pressing. This bound water can be driven off by heating the basemat to increase the partial pressure of water, driving it from the basemat. However, heating the basemat and all of the water held in the pores is relatively expensive, particularly when the high price of fossil fuels is considered. The water retention value ("WRV") is defined as the weight of the bound water as a percentage of the dry weight of the sample.

The use of silicone compounds are known for treating expanded perlite to reduce the amount of bound water present in the basemat. U.S. Pat. No. 5,964,934, herein incorporated by reference, describes an acoustical panel that utilizes expanded perlite that has been treated with silicone polymers, siloxanes, reactive silane monomers and other silicon compounds to reduce the bound water. However, there are several disadvantages to using silicone compounds to treat perlite. Silicone polymers are expensive. They cost almost four times the cost of typical thermoplastic polymers. There are also handling and health related hazards associated with the use of silicone polymers. Also, there are detrimental effects on the physical properties of the panels as a result of treating the perlite with a silicone coating. Approximately 20% of the strength of a panel is typically lost when silicon compounds are used to coat expanded perlite. Commercially available silicon treated perlite (STP) is extremely difficult to wet and to disperse in water, making them difficult to blend into the slurry.

There is a need for a treatment of expanded perlite to reduce the amount of bound water present in acoustical panels. The treatment must be effective in reducing the water that is absorbed into the pores of the perlite particles but should permit the treated perlite to mix into the slurry and wet out easily. Hazards and cost of the treatment should be reduced and the physical properties of the resulting panels should not be negatively affected.

BRIEF DESCRIPTION OF THE INVENTION

These and other objects are met by the present invention that provides a building panel. More specifically, a composition for a slurry for the manufacture of a building panel includes one or more fillers, one or more binders and water. At least one of the fillers is an expanded perlite at least partially covered with a thermoplastic, film-forming polymer coating. In some embodiments, the thermoplastic, film-forming polymer comprises a hydrophilic polymer, such as an acrylic or vinyl acrylic polymer. In other embodiments, hydrophobic or stericly hindered polymers, such as styrene and styrene acrylic polymers, are used. Some embodiments use a calcined or uncalcined gypsum as the binder or filler.

One method of making a building panel includes expanding perlite and then coating the expanded perlite with a film-forming thermoplastic polymer coating. After the expanded perlite is coated with the firm-forming thermoplastic polymeric coating, it is combined with water and the binder to form a slurry. The slurry is shaped into a panel and allowed to dry.

Some embodiments of this invention are to a building panel that includes a solid matrix of calcium sulfate dihydrate crystals bound to expanded perlite. The expanded perlite includes a film-forming thermoplastic polymer coating.

The use of the thermoplastic, film-forming polymer emulsion as a coating for expanded perlite is beneficial for several reasons. There is a significant reduction in perlite water retention which directly translates to a reduction in the amount of water contained in the pre-dried board product. Since less water is entering the interior of the perlite particles, there is less water that needs to be driven off by heat. Use of heat to drive off the moisture is expensive in terms of fuel costs. The discovery of a slurry composition that reduces the amount of evaporative water (i.e., dryer demand), would reduce the amount of fuel needed to make the resulting panel. The fuel reduction can be taken by reducing the kiln temperature or by reducing the residence time of the building panel in the kiln, for example, by increasing the line speed through the dryer. In manufacturing lines that are kiln limited, an overall increase in line speed can be realized.

Emulsions of thermoplastic, film-forming polymers are also relatively inexpensive compared to silicone oils. At about one quarter the price of silicones, a significant savings in raw materials results. The physical properties of boards produced using a film-forming thermoplastic polymer coated perlite are also improved over similar boards produced using a silicone oil coated perlite.

DETAILED DESCRIPTION OF THE INVENTION

The product, method and composition of this invention are intended to apply to panels or tiles commonly referred to as building panels, acoustical panels, ceiling tiles and the like. In the following discussion, the invention is referred to as a building panel as one embodiment of the invention. Although many embodiments of the invention have acoustical properties, it is not a requirement of the invention. The building panels are useful on walls and in other locations, and are not intended to be limited to use in a ceiling. Unless noted otherwise, compositions are calculated by weight based on the weight of the dry ingredients.

The primary ingredient in the novel building tile of this invention is one or more fillers. Expanded perlite that has been treated with a film-forming thermoplastic polymer coating to reduce the amount of bound water is used as one filler in some embodiments. It is well known to use expanded perlite in compositions for acoustical panels. They are often preferred components because of their low cost and low density, about 3-10 pounds/ft$^3$. The expanded perlite provides bulking that reduces the overall product density.

Perlite is formed from any glass rock with the capacity to expand on heating, similar to obsidian, and particularly comprises volcanic glass of rhyolitic composition. Perlite generally contains 65-75% silica, 10-20% alumina, 2-5% water and smaller amounts of soda, potash, and lime. When heated to its softening point, the water in the perlite, which turns to steam, expands rapidly, causing the rock to expand like popcorn. The volume of the perlite is increased approximately tenfold forming light, fluffy particles.

In the conventional method of preparing expanded perlite, the perlite ore is first ground to a fine size. The perlite is expanded by introducing the finely ground perlite ore into heated air. Typically, the perlite expanding apparatus heats the air to about 1750° F. (954° C.). The perlite is entrained in the heated air that warms it and causes it to expand. After expansion, the change in density of the perlite allows it to flow from the expander with the hot air. Expanded perlite has a large number of cracks, fissures and cavities that are capable of holding a great deal of bound water. Bound water is water that cannot be mechanically removed from the perlite particles through either vacuum or pressing. It is held in place by capillary action or hydrogen bonding, and must be driven off using heat. Heating the perlite to drive off the bound water is expensive in terms of fuel expenditures.

To limit the bound water, the expanded perlite is at least partially coated with a film-forming, thermoplastic polymer coating that discourages water from entering the cavities, fissures and cracks of the perlite. The openings are not filled with thermoplastic, film-forming polymer to physically block the water from entering. Rather, the nature of the thermoplastic, film-forming polymer is selected so that a thin coating is sufficient to inhibit the ingress of water into the interior of the perlite particles Cavities do not fill up with water because it is repelled on a molecular level by ionic charges.

Many different thermoplastic, film-forming polymers are useful in the coating. Hydrophilic polymers, hydrophobic polymers or mixtures thereof are used. Table I shows a range of thermoplastic, film-forming polymers, from hydrophilic to hydrophobic, that are useful in reducing bound water. Examples of hydrophobic polymers include GENFLO 3317, a styrene butadiene from Omnova Solutions and LUCIDENE 615, a styrene acrylic from Rohm and Haas. Examples of hydrophilic polymers include ROVACE 9100, a vinyl acrylic from Rohm and Haas. Some embodiments utilize another type of thermoplastic, film-forming polymer which uses steric hindrance as a means of keeping water molecules out. Long side chains on the thermoplastic, film-forming polymer make it difficult for water to occupy space in the fissures and cavities when the stericly-hindered polymer is present. Many of the thermoplastic film-forming polymers have glass transition temperatures of about 10° C. to about 110° C. Coatings made with any combination of useful thermoplastic, film-forming polymers are also contemplated.

TABLE I

| Rank | Polymer Type | Manufacturer | Name | Measured Contact Angle | $T_g$, ° C. |
|---|---|---|---|---|---|
| 1 | Styrene Butadiene | Omnova | Genflo 3117 | 86.8 | 90° |
| 2 | Styrene Acrylic | Rohm & Haas | Lucidene 615 | 81.3 | 20° |
| 3 | Styrene Acrylic | Rohm & Haas | Lucidene 4035+ | 67.9 | 30° |
| 4 | Styrene Acrylic | Rohm & Haas | Rhoplex P-376 | 64.3 | 19° |
| 5 | Styrene Acrylic | Rohm & Haas | Rhoplex WL 100 | 61.5 | Na |
| 6 | Acrylic | Rohm & Haas | Rhoplex HA-12 | 52.1 | 22° |
| 7 | Styrene Butadiene | Omnova | Genflo 3060 | 51.7 | 20° |
| 8 | Styrene Acrylic | Dow Reichhold | DL 218 NA | 50.0 | 93° |
| 9 | Acrylic | Rohm & Haas | Rhoplex EI-6000 | 43.8 | 14° |
| 10 | Polyvinyl Acetate Homopolymer | Rohm & Haas | Rovace 3270 | 37.0 | 38° |
| 11 | Vinyl Acrylic | Rohm & Haas | Rovace 9100 | 10 | 12° |
| 12 | Ethylene Vinyl Chloride | Air Products | Airflex 4530 | 8.2 | 29° |

The thermoplastic, film-forming polymers in Table 1 are ranked from most hydrophobic to most hydrophilic. Rank was determined using a Ramé-Hart model 100-00 Contact Angle Goniometer. A thin film of each thermoplastic, film-forming polymer was spread on a microscope slide using a pipette and then drying the thermoplastic, film-forming polymer film in an oven to achieve a film. For each thermoplastic, film-forming polymer sample a drop of water was placed on the film. The water droplet readily wets the hydrophilic polymeric film maximizing contact with the polymer and producing a low contact angle. The water droplet readily does not readily wet the hydrophobic polymeric film tended to minimize polymer contact and thus stayed in a ball with a corresponding high contact angle.

The thermoplastic film-forming polymer is generally available in the form of an emulsion having from about 40 to about 55% solids. A coating solution is formed when the liquid thermoplastic, film-forming polymer emulsion is diluted with water. Some diluted coating solutions include from about 2% to about 55% polymer solids on a weight basis (weight of thermoplastic, film-forming polymer solids divided by total diluted solution weight). The percent solids of the diluted coated solution is typically chosen to provide an acceptable amount of liquid for the spray application system. Coating the perlite is preferably carried out by spraying a measured amount of the diluted coating solution onto the perlite. In some embodiments, the perlite is charged to a lab cement mixer and agitated while the coating is being sprayed thereon. Knowing the weight of the unused coating solution is useful to monitor the amount of coating solution that has been retained by the expanded perlite.

Optional ingredients are either added directly to the panel slurry. Components that are commonly added are briefly described below. The panel can also be coated when specific properties are desired. Others ingredients and treatments will be known to artisans of building panels or their coatings. The other components and concentrations of the coating is highly dependant on the purpose for which the coating is being applied.

Preferably, at least one additional ingredient is a fiber, such as a cellulosic fiber, which serves to provide green strength. The cellulose fiber may also function as a binder and also help retain fines. Several types of cellulosic fiber have been evaluated in these compositions. It is well known to use newsprint or other post-consumer paper in acoustical tile formulations, and both hammer-milled and hydro-pulped newsprint have been evaluated. Newsprint is preferred for price considerations. Refined paper fibers and wood fiber may also be used as the source of cellulosic fiber; however, it has been found that ceiling tiles made using longer softwood or kraft fiber are more difficult to cut with a knife at the installation site. Furthermore, kraft fibers are a more expensive source of the cellulosic fiber. When used, cellulosic fibers are present in amounts up to 75% by weight of the dry panel. Preferably, cellulosic fiber makes up less than 30% of the panel by weight. More preferably, the weight of cellulosic fiber is from about 1% to about 30% or from about 12% to about 28%. Other fibers, such as glass or plastic fibers, are also useful. Mineral wool is a commonly used fiber in some types of building panels.

Gypsum is another preferred filler in the panels of the present invention. One gypsum source is raw calcium sulfate dihydrate, known as landplaster. Recycled materials are usable that include gypsum that was previously calcined to the hemihydrate and rehydrated. Alternatively, in some embodiments the gypsum source may be calcined gypsum that is rehydrated during panel formation to form an interlocking matrix of dihydrate crystals. The calcined gypsum may be co-calcined with the cellulosic fiber material to form a composite material of cellulose fibers interlocked with calcium sulfate crystals. Another source of both gypsum and cellulosic fibers is waste or scrap gypsum wallboard. Panels made by this process are described in more detail in U.S. Pat. No. 5,320,677, herein incorporated by reference. The scrap can be ground and added to the slurry, or it can be feed material for a co-calcining process. There are many advantages of adding gypsum to acoustical panels, including improved surface hardness and fire resistance.

Other fillers are also useful in the composition of this invention. Inorganic fillers, such as clays, mica, wollastonite, silica, perlite and calcium carbonate are also suitable.

Another component of the panels is the binder. In some embodiments, the cellulose fibers provide sufficient adhesion to function as the binder. However, in some embodiments it is also desirable to include a secondary binder, such as starch, in the composition. Other binders, such as a latex binder may be used with or without the starch if desired. In some embodiments, calcium sulfate hemihydrate functions as a binder, forming a matrix of interlocking dihydrate crystals that hold the panel together.

Starch is very cost efficient and is a preferred binder. It is well known to use starch as a binder in building panels. A starch gel may be prepared by dispersing starch particles in water and heating the starch slurry until the starch is fully cooked and the starch slurry thickens into a viscous gel. A portion of the cellulosic fibers may be incorporated into the starch slurry prior to cooking. The cooking temperature of the starch slurry should be closely monitored to assure full swelling of the starch granules. A representative cooking temperature for cornstarch is about 180° F. (82° C.) to about 195° F. (90° C.). Starch may also be used as a binder without precooking the starch, because it forms a gel during the process of drying the basemat.

The latex binder may be used in place of the starch, or, the latex binder may be used in addition to the starch binder. Many of the latex binders useful in some embodiments, such as acoustical ceiling tile formulations, are disclosed in U.S. Pat. No. 5,250,153, herein incorporated by reference. It is well known in the art to use latex binders in acoustical tiles based on mineral wool. These latex binders may have a glass transition temperature ranging from about 10° C. (50° F.) to about 110° C. (230° F.). Examples of latex binders include polyvinyl acetate, vinyl acetate/acrylic emulsion, vinylidene chloride, polyvinyl chloride, styrene/acrylic copolymer and carboxylated styrene/butadiene.

In some embodiments, the building panel is bound together with hydrated gypsum. Where calcined gypsum is present in the slurry, it hydrates to form an interlocked matrix of calcium sulfate dihydrate crystals. As the matrix forms, some of the expanded perlite becomes interlocked in the interstices between the dihydrate crystals, binding the two substances together. The ceiling tile of the present embodiment may also be made without starch calcium sulfate hemihydrate or latex binders, but preferably at least one of them is present. In a preferred embodiment, the composition includes both starch and cellulosic fibers. Some embodiments of the building panel utilize the calcium sulfate dihydrate matrix as a primary binder, and at least one of starch, fibers, the latex binder or combinations thereof as a secondary binder.

Another optional ingredient in building panels is clay, which is used to improve fire resistance. When exposed to fire, the clay does not burn, but uses some of the heat energy to sinter. The composition optionally includes from about 4% to about 25% clay by weight. Many different types of clay may be used, including Ball Clay from Gleason, Tex.; CTS-1 and CTS-2 from KT Clay of Sledge, Miss., Spinks Clay from Gleason, Tex. and old Hickory Clay from Hickory, Ky. Other commercial clays, such as Bentonite and Kaolin are also useful in acoustical tile formulations. In addition, the acoustical compositions of some embodiments may also contain other ingredients as are well known in formulations of this type. Lightweight aggregates, surfactants and flocculants are also useful and are well known to an artisan of acoustical tile preparation. Flocculants are optionally used to promote aggregation of small fibers and particles. They are generally used in amounts of from about 0.1% to about 1.0%. A useful flocculant is BUFLOC 594 (Buckman Laboratories, Memphis, Tenn.).

In most cases, exterior coatings are applied to the surfaces of the building panels to impart certain properties to the product. For the purposes of this discussion, the "exterior coating" is a coating applied to the dried surface of the panel and is used to distinguish it from the perlite coating. Often, a number of different exterior coatings are used on a single panel to produce a certain combination of properties. In some embodiments, exterior coatings on one or more surfaces of a panel are designed for color, a pleasing look and appearance. The "face" of the panel is defined as the surface of the building panel that is intended to be adjacent to the living space. Exterior coatings applied to the back of the panel (the "back" is defined as the surface opposing the panel "face") of many embodiments are directed less to the appearance and more to sound-modifying properties. Ideally, building panels act as a sound-absorbent to minimize sound from passing through them and into adjacent living spaces and to minimize reflection of sound back into the room or other space in which the panel is installed. Where sound deadening properties are desired, those embodiments preferably include a coating on the back of the panel that is designed to prevent the transmission of sound through the panel.

A number of useful ingredients are also added to the exterior coatings depending upon the application. Pigments, such as titanium dioxide for whiteness are common components and are preferably used in amounts less than 50% by weight of the prepared coating. Clays are used in amounts of up to 70% by weight. Dispersants in amounts up to 1% help keep the dry components in suspension. Thickeners, such as cellulosic thickeners, are used in amounts of up to 10% of the coating weight. Up to 0.5% of a defoamer is used to reduce entrainment of air during mixing. These components are all dissolved or dispersed in water.

Facing materials are adhered to the major surfaces of the building panels. They provide strength, particularly green strength, to the panel during manufacture. Surface properties of the building panels are optionally modified with facing materials. Aesthetics of the panel can be improved by the use of facings that easily receive decorative finishes. An example of such a facing is paper. Sound characteristics of the living space adjacent the panel can be varied by selection of facing materials. Fiberglass, for example, is acoustically transparent and will let sound travel into the building panel core and adjacent living spaces while paper will reflect sound.

Amounts of water vary greatly depending on the exterior coating use, but preferably from about 20% to about 98% of the coating weight is water. More preferably, water is from about 30% to about 95% of the coating weight. Exterior coatings that include pigments or clays preferably include from about 20% to about 500% water, while exterior coatings designed primarily to carry a biocide or other fluid component preferably have from about 85% to about 98% water by coating weight.

Panels are made at least ⅛ of an inch thick according to any known method of making building panels. Some embodiments of the building panel are made by a process similar to that used to make gypsum wallboard, such as U.S. Pat. No. 6,893,752, herein incorporated by reference. The process begins by mixing a slurry of the filler, binder and water. Ingredients in liquid form are usually mixed with the measured amount of water before the dry ingredients are added. Where latex binders are supplied in the form of a liquid emulsion, they are mixed with the water prior to the addition of the dry ingredients.

Dry ingredients are measured prior to mixing. These ingredients are optionally dry blended prior to addition to the water. After the dry ingredients are added to the water and any liquid ingredients that are mixed therein, the aqueous composition is mixed until a slurry of uniform consistency is achieved. Once formed, the slurry is transferred from the mixing vessel to form the panels.

If a casting process is used, the slurry is transferred to molds of the desired size and shape where the water is either absorbed by one or more of the ingredients or it evaporates. Absorption includes physical absorption such as capillary action, chemical absorption such as hydration, or both. The panel is optionally removed from the mold once a sufficient amount of water has been absorbed or has evaporated that the panel holds together. After removal from the mold, the panel is further dried, preferably by driving off the water in an oven.

Another well-known method of making building panels is by a felting process, such as that described in U.S. Pat. No. 6,413,376, herein incorporated by reference. The slurry is poured into a head box that distributes the slurry along the width of the forming table. From the head box, the slurry is deposited onto a felting conveyor on which a filter cake is formed. The filter cake is dewatered by separation of water from the slurry passing through the porous forming surface of the conveyor. As much as 90% of the uncombined water may be removed from the filter cake by the felting conveyor. Dewatering is preferably aided by a vacuum to remove additional water. In cases where calcium sulfate hemihydrate is used as a binder, as much water as practical is preferably removed before the hemihydrate cools and is converted to the dihydrate. The formation of the filter cake and its dewatering are described in U.S. Pat. No. 5,320,677, herein incorporated by reference.

The dewatered filter cake is wet-pressed to further reduce the water content and to compact the filter cake into the desired shape, thickness and/or density. While the filter cake is still able to be shaped, it is preferably wet-pressed into a board or panel of the desired size and thickness. If the board is to be given a special surface texture or a laminated surface finish, the surface is preferably modified during or following this step. The wet-pressing step preferably takes place with gradually increasing pressure to preserve the product integrity.

After dehydration is sufficiently complete for the product to hold its shape, the boards can be cut and trimmed if desired, and sent to a kiln for drying. In the case where calcium sulfate hemihydrate is used as a binder, it is desirable to dry the product at a sustained temperature between about 110.degree. F. to about 125.degree. F. Where uncooked starch is used as a binder, it is desirable to dry the product under conditions that allow the product core temperature to reach at least 170° F. (77° C.), more preferably, a core temperature of between about 170° F. (77° C.) and about 200° F. (93° C.) is reached.

If desired, openings, pinholes or depressions are formed on the front side of the panel to absorb sound. The openings are made by scoring, fissuring, needling or creating depressions in the basemat by any other means known in the art. Where the panels are cast, the mold could advantageously be shaped to provide the depressions in the cast article. After oven drying; the panels are coated, if desired, with coatings such as those described above that are suitable for the particular application for which the panels are intended.

Example 1

Samples of coated perlite were prepared using #3 perlite from Silbrico Corp., Hodgkins, Ill. Three styrene/acrylic polymers were requested from Rohm & Hass, Philadelphia, Pa., and are described in Table II. Unless otherwise noted, all weights reported are in grams.

TABLE II

THERMOPLASTIC FILM-FORMING POLYMER DESCRIPTION

| Polymer | Description | $T_g$ |
|---|---|---|
| LUCIDENE 615 | Styrene/Acrylic Polymer | 20° C. |
| LUCIDENE 4035 PLUS | Styrene/Acrylic Polymer | 30° C. |
| RHOPLEX P-376 | Styrene/Acrylic Binder | 19° C. |

The coated perlite was made by charging a small cement mixer with 1000.0 grams of the perlite. A 5% active thermoplastic, film-forming polymer solution was charged to an airless sprayer and the sprayer was tared. The mixer was started and the solution was sprayed onto the perlite. Periodically, the sprayer was weighed, and spraying continued until the appropriate amount of thermoplastic, film-forming polymer solution was used. The coated samples and the amount of each coating are listed in Table III. The samples were then dried at a temperature sufficient to firm-form the thermoplastic, film-forming polymer. Sample numbers shown here identify the exact coated perlite used in subsequent tests.

TABLE III

PREPARED COATED EXPANDED PERLITES

| SAMPLE NO. | DESCRIPTION | WEIGHT PERLITE | WEIGHT SOLUTION | WEIGHT COATING |
|---|---|---|---|---|
| 1 | CONTROL | 1000.0 | 0.0 | 0.00% |
| 2 | LUCIDENE 615 | 1000.0 | 104.7 | 0.52% |
| 3 | LUCIDENE 615 | 1000.0 | 210.0 | 1.05% |
| 4 | LUCIDENE 615 | 1000.0 | 412.6 | 2.06% |
| 5 | LUCIDENE 4035 PLUS | 1000.0 | 106.8 | 0.53% |
| 6 | LUCIDENE 4035 PLUS | 1000.0 | 254.8 | 1.27% |
| 7 | LUCIDENE 4035 PLUS | 1000.0 | 400.2 | 2.00% |
| 8 | RHOPLEX P-376 | 1000.0 | 109.5 | 0.55% |
| 9 | RHOPLEX P-376 | 1000.0 | 204.0 | 1.02% |
| 10 | RHOPLEX P-376 | 1000.0 | 368.5 | 1.84% |
| 11 | CONTROL | 1000.0 | 0.0 | 0.00% |

Example 2

The water retention value ("WRV") of the treated expanded perlite was tested by making small samples of basemat as follows:

1. Pre-weighed a #40 Whatman 12.5 cm filter paper and a 600 ml glass beaker.
2. Weighed out a 15.0 gram sample of perlite.
3. Added perlite to 300 ml of water. Stirred with spatula. Allowed to sit for 30 seconds (timed).
4. Added slurry with stirring to a Buchner funnel containing filter paper. Rinsed out the beaker with a water bottle.
5. Applied 20"Hg vacuum for 60 seconds (timed).
6. Shut off vacuum, transferred wet pad to a beaker of known weight and weighed wet pad and beaker.
7. Dried to constant weight in a 105° C. oven.
8. Weighed oven dried pad and beaker. Calculated moisture content of wet pad.

This procedure was repeated three times and the average value was reported for each sample of treated perlite. A summary of all test results is shown in Table IV. All but one of the coated perlites shows an improved (i.e., lower) water retention value compared to the control (uncoated) samples. The wetability value of 10 denotes that all of the coated perlite samples were readily wetted by the water during the test process.

TABLE IV

WRV TEST RESULTS

| Panel | Coating | Coating Level | WRV | Wetability Factor |
|---|---|---|---|---|
| 1 | 0.5% Lucidene 615 | 0.52% | 97.7 | 10 |
| 2 | 1.0% Lucidene 615 | 1.05% | 167.4 | 10 |
| 3 | 2.0% Lucidene 615 | 2.06% | 101.0 | 10 |
| 4 | 0.5% Lucidene 4035 Plus | 0.53% | 136.6 | 10 |
| 5 | 1.0% Lucidene 4035 Plus | 1.27% | 143.5 | 10 |
| 6 | 2.0% Lucidene 4035 Plus | 2.00% | 130.9 | 10 |
| 7 | 0.5% Rhoplex P-376 | 0.55% | 239.5 | 10 |
| 8 | 1.0% Rhoplex P-376 | 1.02% | 149.4 | 10 |
| 9 | 2.0% Rhoplex P-376 | 1.84% | 96.2 | 10 |
| 10 | Control | 0.00% | 209.9 | 10 |
| 11 | Control | 0.00% | 270.3 | 10 |

Example 3

In the next phase of testing, small lab-scale acoustical tiles, known as Tappi boards, were made in the lab to determine the amount of bound water present. The Tappi boards were prepared using each of the treated perlites described above according to the procedure listed below. Tappi Board Making Procedure:

1. Weighed out water and placed in mix bucket.

2. Added paper fiber, mineral wool, perlite, starch, calcium carbonate and latex binder (if applicable). Mixed for 3.0 minutes at the maximum setting.

3. Added flocculent and mixed for an additional 15 seconds.

4. Placed nonwoven scrim on wire in Tappi box and fill Tappi box with water to a level that covered the scrim.

5. Added slurry to Tappi former. Opened bottom valve and allow slurry to drain.

6. Applied 5 seconds of 20" Hg vacuum.

7. Transferred formed mat to a tared plate and weighed formed mat (wet weight).

8. Placed mat in a hydraulic press sandwiched between a plastic scrim and a perforated plate on each side.

9. Pressed to stated thickness. Removed from press, removed wires and plates and transferred mat to a tared plate. Weight pressed mat (press weight).

10. Place pressed mat back into Tappi former and apply an additional 5 seconds of 20" Hg vacuum.

11. Transferred formed mat to a tared plate and weighed formed mat (wet weight).

12. Transferred to oven. Panels were dried at 600° F. until the oven temperature reached 600° F. Boards were then dried for 3 hours at 350° F. Weighed dried panel (dry weight).

Target values for the boards were 0.6 in thickness and a density of 12.5 lbs/ft$^3$. The composition of the boards is shown in Table V.

TABLE V

Basemat Composition

| Component | Wt. Percent | Dry Weight | % Solids | Total Weight |
|---|---|---|---|---|
| Mineral Wool | 10.00% | 40.00 g | 100.00% | 40.00 g |
| Perlite | 57.00% | 228.00 g | 100.00% | 228.00 g |
| Newsprint | 19.00% | 76.00 g | 2.79% | 2725.99 g |
| Starch | 8.00% | 32.00 g | 90.00% | 35.56 g |
| CaCO3 | 6.00% | 24.00 g | 100.00% | 24.00 g |
| Total | 100.00% | 400.00 g | | 3053.54 g |

The starch used was cornstarch available from Corn Products International of Westchester, Ill. Hydropulped newsprint was supplied by the USG Cloquet plant, calcium carbonate was obtained from Cutler Magner and mineral wool was obtained from the USG Red Wing plant.

Evaluation of each of the coated perlites in the laboratory basemat described above is shown in Table VI. These results demonstrate the benefits of using a thermoplastic, film-forming polymer coated perlite in this type of acoustical ceiling product. The final column entitled "% Water Removed" clearly demonstrates the additional water that can be removed by the use of such a thermoplastic, film-forming polymer coating.

TABLE VI

Evaluation of Perlite Coated with Styrene/Acrylic Polymer

| No. | Initial Vacuum Weight | Press Weight | Tipple Moisture After Pressing | 2nd Vacuum Weight | OD Weight | Tipple Moisture After 2nd Vacuum | % Water Removed |
|---|---|---|---|---|---|---|---|
| 1 | 1382 | 1337 | 71.9% | 1044 | 375.2 | 64.1% | 20.8 |
| 2 | 1816 | 1245 | 69.9% | 1046 | 374.8 | 64.2% | 20.4 |
| 3 | 1429 | 1302 | 71.3% | 999 | 374.3 | 62.5% | 26.2 |
| 4 | 1700 | 1272 | 70.5% | 1042 | 374.7 | 64.0% | 20.9 |
| 5 | 1696 | 1312 | 71.4% | 1063 | 375.3 | 64.7% | 18.6 |
| 6 | 1666 | 1284 | 70.7% | 1048 | 376.3 | 64.1% | 20.7 |
| 7 | 1896 | 1391 | 72.9% | 1147 | 377.5 | 67.1% | 10.2 |
| 8 | 1592 | 1353 | 72.6% | 1094 | 370.4 | 66.1% | 13.5 |
| 9 | 1438 | 1376 | 73.0% | 1058 | 372.2 | 64.8% | 18.1 |
| 10 | 2538 | 1447 | 74.0% | 1256 | 376.7 | 70% | — |
| 11 | 2116 | 1480 | 74.8% | 1244 | 373.4 | 70.0% | — |

Example 4

MOR testing was performed on the boards produced in Example 3 above. Tests were conducted on the laboratory INSTRON materials testing machine (Instron Corporation, Norwood, Mass.) using a 100-pound load cell. Settings for the chart speed were Bx (left) and By (right) providing a chart speed of 10 cm/min. Settings for the crosshead speed were Dx (left) and Dy (right) providing a crosshead speed of 5 cm/min. A 20-pound full-scale setting was used. Samples were conditions for 24 hours at 70° F./50% relative humidity prior to testing.

Two-inch Ball hardness was conducted on the lab INSTRON materials testing machine. Settings for the chart speed were Bx (left) and By (right) providing a chart speed of 10 cm/min. Settings for the crosshead speed were Dx (left) and Dy (right) using a 10:1 reducer providing a crosshead speed of 0.5 cm/min. Using these gears, a 0.25-inch ball indentation corresponds to 5.0 inches on the chart. A 0.25" ball indentation was determined using a 0.250" ring centered around the ball. A 250 kg load cell was used at a 100 kg full scale setting. Samples were conditioned for 24 hours at 70° F./50% relative humidity prior to testing. Results of these tests are shown in Table VII. These results demonstrate that the use of a thermoplastic, film-forming polymer coated perlite did not adversely affect the physical properties of the resulting panels.

TABLE VII

| Board No. | Thickness | Density | MOR | Corrected MOR | 2" Ball Hardness |
|---|---|---|---|---|---|
| 1 | 0.539 | 12.78 | 126.1 | 120.6 | 152.1 |
| 2 | 0.557 | 12.46 | 118.3 | 118.0 | 162.7 |
| 3 | 0.532 | 12.86 | 123.2 | 116.5 | 151.0 |
| 4 | 0.551 | 12.48 | 118.5 | 118.8 | 150.7 |
| 5 | 0.557 | 12.32 | 115.6 | 118.9 | 150.7 |
| 6 | 0.548 | 12.66 | 119.7 | 116.7 | 161.5 |
| 7 | 0.541 | 12.90 | 140.7 | 132.0 | 175.0 |
| 8 | 0.541 | 12.52 | 120.6 | 120.1 | 149.5 |
| 9 | 0.538 | 12.81 | 132.7 | 126.3 | 152.1 |
| 10 | 0.561 | 12.48 | 122.5 | 123.1 | 179.1 |
| 11 | 0.554 | 12.34 | 113.9 | 137.5 | 174.9 |

Example 5

Additional polymer types shown in Table VIII were tested as coatings for perlite. Solutions of 5% polymer solids were made according to Example 1 and coated on 1000 grams of #3 perlite from Silbrico.

TABLE VIII

Thermoplastic Film-Forming Polymers for Perlite Coatings

| Product Name | Sample | Polymer Type | Manufacturer | $T_g$ |
|---|---|---|---|---|
| Rovace 3270 | | Polyvinyl Acetate Homopolymer | Rohm & Haas | 38° C. |
| Airflex 4530 | | Ethylene Vinyl Chloride | Air Products | 29° C. |
| Rhoplex HA-12 | | Acrylic | Rohm & Haas | 22° C. |
| Rovace 9100 | | Vinyl Acrylic | Rohm & Haas | 12° C. |
| Genflo 3060 | | Styrene Butadiene | Omnova | 20° C. |

Expanded perlite was treated with the above thermoplastic, film-forming polymers according to the procedure of Example 1. The WRV was determined according to the procedure of Example 2 and presented below.

| Sample | Coating and Coating Level | WRV |
|---|---|---|
| 12 & 18 | Untreated | 246.6 |
| | Untreated | 301.2 |
| | Treated with 0.48% Rovace 3270 | 119.3 |
| 13 & 19 | Treated with 0.99% Rovace 3270 | 118.1 |
| | Treated with 0.48% Airflex 4530 | 172.7 |
| 14 & 20 | Treated with 1.04% Airflex 4530 | 160.1 |
| | Treated with 0.52% Rhoplex HA-12 | 168.5 |
| 15 & 21 | Treated with 1.01% Rhoplex HA-12 | 151.2 |
| 16 & 22 | Treated with 0.58% Rovace 9100 | 126.0 |
| | Treated with 1.10% Rovace 9100 | 177.0 |
| 17 & 23 | Treated with 0.49% Genflo 3060 | 132.1 |

Tappi Boards were made using the coated expaned perlites of samples 12-23 according to the procedure of Example 3. The water removal values were determined according to the procedures stated in Example III above, and are reported in Table IX.

TABLE IX

Water removal of various polymers

| No. | Initial Vacuum Weight | Press Weight | Tipple Moisture After Pressing | 2$^{nd}$ Vacuum Weight | OD Weight | Tipple Moisture After 2$^{nd}$ Vacuum | % Water Removed |
|---|---|---|---|---|---|---|---|
| 12 | 1701 | 1425 | 74.2% | 1133 | 367.9 | 67.5% | — |
| 13 | 1411 | 1337 | 72.9% | 1041 | 363.8 | 65.1% | 8.1 |
| 14 | 1461 | 1337 | 72.8% | 1030 | 363.7 | 64.7% | 9.3 |
| 15 | 1491 | 1317 | 72.6% | 1045 | 364.4 | 65.1% | 7.8 |
| 16 | 1428 | 1325 | 72.6% | 1037 | 363.3 | 65.0% | 8.4 |
| 17 | 1477 | 1328 | 72.6% | 1021 | 364.2 | 64.3% | 10.6 |
| 18 | 1815 | 1371 | 73.4% | 1113 | 365.4 | 67.2% | — |
| 19 | 1396 | 1332 | 72.9% | 1040 | 361.4 | 65.3% | 7.4 |
| 20 | 1523 | 1355 | 72.9% | 1055 | 366.7 | 65.2% | 7.4 |
| 21 | 1496 | 1320 | 72.5% | 1045 | 362.9 | 65.3% | 7.3 |
| 22 | 1449 | 1342 | 72.7% | 1047 | 366.0 | 65.0% | 8.1 |
| 23 | 1448 | 1340 | 73.0% | 1029 | 361.6 | 64.9% | 8.7 |

Example VIII

MOR Hardness testing as described in Example IV on boards 12-23. The results are shown in Table X below

TABLE X

| Board No. | Thickness | Density | MOR | Corrected MOR |
|---|---|---|---|---|
| 12 | 0.570 | 11.81 | 51.9 | 53.6 |
| 13 | 0.561 | 11.93 | 52.6 | 53.4 |
| 14 | 0.557 | 11.93 | 53.2 | 53.5 |
| 15 | 0.566 | 11.77 | 54.1 | 56.4 |
| 16 | 0.558 | 11.94 | 55.1 | 55.7 |
| 17 | 0.558 | 11.96 | 51.2 | 51.5 |
| 18 | .0.565 | 11.77 | 55.0 | 57.1 |
| 19 | 0.556 | 11.88 | 56.4 | 57.6 |
| 20 | 0.568 | 11.84 | 51.9 | 53.3 |
| 21 | 0.562 | 11.87 | 75.7 | 77.2 |
| 22 | 0.556 | 23.251 | 70.7 | 69.0 |
| 23 | 0.557 | 23.22 | 71.8 | 70.4 |

As before, the use of a thermoplastic, film-forming polymer coated perlite promotes a drop in Tipple Moisture indicating that the polymer coating was effective in preventing the water from entering the perlite particles. Additionally, the use of the thermoplastic, film-forming polymer coating did not adversely affect the physical properties of the resulting board.

While particular embodiments of the acoustical panel and slurry having reduced bound water of the present invention have been shown and described, it will be appreciated by those skilled in the art that changes and modifications may be made thereto without departing from the invention in its broader aspects and as set forth in the following claims.

What is claimed is:

1. A composition for a slurry for manufacture of a building panel comprising:
    one or more fillers, wherein at least one of said one or more fillers is an expanded perlite at least partially covered with a film-forming thermoplastic polymer coating, wherein said film-forming thermoplastic polymer has a glass transition temperature ranging from about 10° C. to about 110° C.;
    one or more binders wherein at least one of said binders comprises starch; and
    water.

2. The composition of claim 1 wherein said polymer coating comprises is a hydrophilic polymer or a hydrophobic polymer.

3. The composition of claim 2 wherein said coating comprises said hydrophilic polymer comprises at least one of the group consisting of an acrylic polymer, a vinyl acrylic polymer and mixtures thereof.

4. The composition of claim 2 wherein said hydrophobic polymer comprises at least one of the group consisting of a styrene polymer, a styrene acrylic polymer and mixtures thereof.

5. The composition of claim 1 wherein said one or more binders further comprises one of the group consisting of fibers, latex binders, calcium sulfate dihydrate crystals and combinations thereof.

6. The composition of claim 5 wherein said latex binder is selected from the group consisting of polyvinyl acetate, vinyl acetate/acrylic emulsion, vinylidene chloride, polyvinyl chloride, styrene/acrylic copolymer, carboxylated styrene/butadiene and combinations thereof.

7. The composition of claim 5 wherein said fibers comprise cellulose fibers.

8. A method of making a building panel comprising:
    acquiring expanded perlite;
    coating said expanded perlite with a film-forming thermoplastic polymer, wherein said film-forming, thermoplastic polymer has a glass transition temperature of about 10° C. to about 110° C.;
    combining water, one or more fillers, one or more binders and the coated expanded perlite to form a slurry, wherein at least one of said binders comprises starch;
    shaping said slurry into a panel; and
    allowing said slurry to dry.

9. The method of claim 8 wherein said coating step comprises spraying.

10. The method of claim 8 further comprising drying the panel in a kiln.

11. The method of claim 8 wherein said shaping comprises felting the slurry, dewatering the slurry to form a filter cake and pressing the filter cake.

12. A building panel comprising:
    a solid matrix of calcium sulfate dihydrate crystals bound to expanded perlite; said expanded perlite including a coating comprising a film-forming thermoplastic polymer coating, wherein said film-forming, thermoplastic polymer has a glass transition temperature of about 10° C. to about 110° C., said expanded perlite being bound with a binder comprising starch.

13. The building panel of claim 12 further comprising a second binder, said second binder being one of the group consisting of gypsum, fibers, a latex binder and combinations thereof.

14. The building panel of claim 12 wherein the calcium sulfate dihydrate crystals are bound to the expanded perlite by an interlocking matrix of calcium sulfate dihydrate crystals.

15. The building panel of claim 13 wherein the latex binder is selected from the group consisting of polyvinyl acetate, vinyl acetate/acrylic emulsion, vinylidene chloride, polyvinyl chloride, styrene/acrylic copolymer, carboxylated styrene/butadiene and combinations thereof.

16. The building panel of claim 12 further comprising one or more exterior coatings.

17. The building panel of claim 12 further comprising one or more facing materials.

18. The building panel of claim 12 wherein said polymer coating is a hydrophilic polymer or a hydrophobic polymer.

* * * * *